US009672582B2

(12) United States Patent
Wang

(10) Patent No.: US 9,672,582 B2
(45) Date of Patent: Jun. 6, 2017

(54) SYSTEMS AND METHODS FOR GAUSSIAN FILTER STANDARD DEVIATION VARIATION

(71) Applicant: Toyota Motor Engineering & Manufacturing North America, Inc., Erlanger, KY (US)

(72) Inventor: Chi-Ming Wang, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 391 days.

(21) Appl. No.: 14/561,380

(22) Filed: Dec. 5, 2014

(65) Prior Publication Data

US 2016/0163026 A1 Jun. 9, 2016

(51) Int. Cl.
*H02M 1/14* (2006.01)
*G06T 1/20* (2006.01)
*G06F 17/50* (2006.01)

(52) U.S. Cl.
CPC ............ *G06T 1/20* (2013.01); *G06F 17/5036* (2013.01); *G06F 2217/82* (2013.01)

(58) Field of Classification Search
CPC ........ H02M 1/12; H02M 1/14; H02M 1/4266; H02M 1/32; H02M 2001/123; H02H 7/1213; G05F 17/5036; G05F 2217/82; G06T 1/20
USPC .................. 363/39, 40, 50, 55, 56.01, 56.12
See application file for complete search history.

(56) References Cited

U.S. PATENT DOCUMENTS

| 7,061,195 B2 | 6/2006 | Ho |
| 8,102,192 B2 | 1/2012 | Mourrier |
| 8,363,428 B2 | 1/2013 | Moon |
| 8,829,713 B2 * | 9/2014 | Ishigaki ................. B60R 25/00 307/66 |

(Continued)

OTHER PUBLICATIONS

Analysis of Shaped Pulse Transitions in Power Electronic Switching Waveforms for Reduced EMI Generation, http://ieeexplore.ieee.org/xpl/articleDetails.jsp?reload=true&arnumber=6877720&sortType%3Dasc_p_Sequence%26filter%3DAND%28p_Publication_Number%3A28%29, Author(s) Oswald, N. Dept. of Electr. & Electron. Eng., Univ. of Bristol, Bristol, UK Stark, B.H. ; Holliday, D. ; Hargis, C. ; Drury, B.

(Continued)

*Primary Examiner* — Adolf Berhane
(74) *Attorney, Agent, or Firm* — Dinsmore & Shohl LLP

(57) ABSTRACT

Systems and methods for Gaussian filter standard deviation variation. One embodiment of a method includes receiving a load current and a drain voltage associated with a switching converter that includes a Silicon Carbide (SiC) Mosfet transistor, determining a derivative of the drain voltage with respect to time, and calculating a switching loss associated with the switching converter. Some embodiments include predicting electromagnetic interference (EMI), selecting a Gaussian standard deviation from the switching loss, and determining a Gaussian switching voltage reference. Still some embodiments include adjusting a component of the SiC Mosfet transistor, based on the Gaussian standard deviation, and the Gaussian switching voltage reference to provide a desired switching loss.

20 Claims, 9 Drawing Sheets

(56) References Cited

U.S. PATENT DOCUMENTS

| | | | | |
|---|---|---|---|---|
| 2005/0035432 A1* | 2/2005 | Kawabata | ............ | H01L 29/1004 257/565 |
| 2006/0189067 A1* | 8/2006 | Kawabata | ............. | H02M 3/335 438/234 |
| 2009/0089731 A1* | 4/2009 | Pileggi | .................... | H03J 5/244 716/118 |
| 2010/0188148 A1* | 7/2010 | Mehta | .................. | H03F 1/3247 330/149 |
| 2012/0300858 A1* | 11/2012 | Morgan | ................. | H04B 14/04 375/242 |
| 2014/0145658 A1 | 5/2014 | Heo | | |
| 2015/0349625 A1* | 12/2015 | Hyoung | .............. | H02M 1/4208 363/46 |
| 2016/0141364 A1* | 5/2016 | Muramatsu | ........ | H01L 29/66333 257/139 |

OTHER PUBLICATIONS

Shaping High-power IGBT Switching Transitions by Active Voltage Control for Reduced EMI Generation, http://ieeexplore.ieee.org/xpl/login.jsp?tp=&arnumber=5953506&url=http%3A%2F%2Fieeexplore.ieee.org%2Fxpls%2Fabs_all.jsp%3Farnumber%3D5953506, Author Xin Yang, Mar./Apr. 2015 issue of IEEE Transactions on Industry Applications. .

Karvonen, A, Thiringer, T., Futane, P., Tuveson, T., & Hoist, H. (2007). Reduction of EMI in Switched Mode Converters by Shaped Pulse Transitions (No. 2007-01-0361). SAE Technical Paper.

Funato, H., Mori, T., Igarashi, T., Ogasawara, S., Okazaki, F., & Hirota, Y. (2013). Optimization of Switching Transient Waveform to Reduce Harmonics in Selective Frequency Bands. IEEJ Journal of Industry Applications, 2(3), 161-169.

Patin, N., & Vinals, M. L. (Oct. 2012). Toward an optimal Heisenberg's closed-loop gate drive for Power MOSFETs. In IECON 2012—38th Annual Conference on IEEE Industrial Electronics Society (pp. 828-833). IEEE.

* cited by examiner

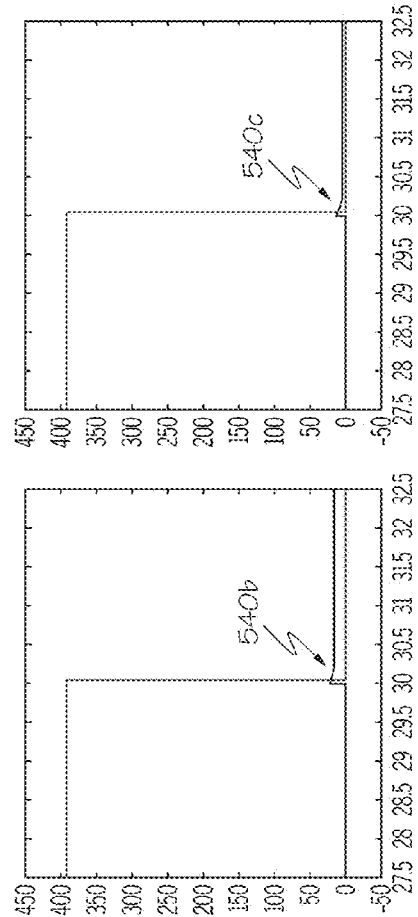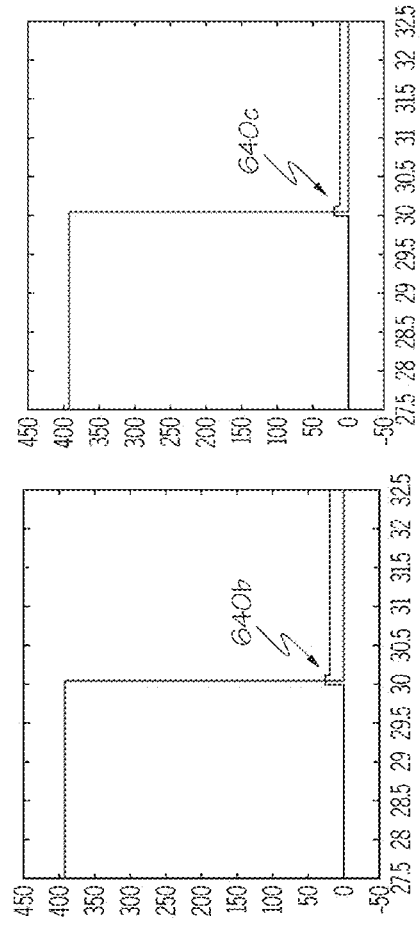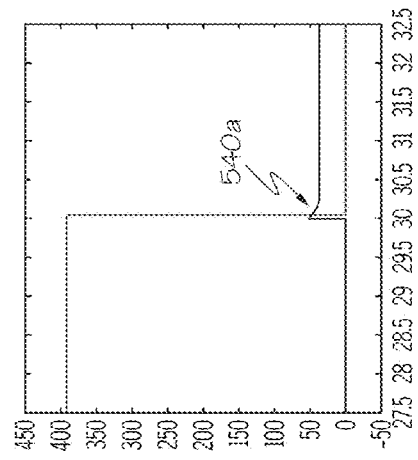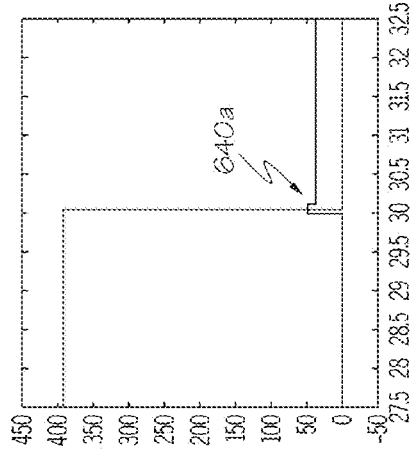
FIG. 5A  FIG. 5B  FIG. 5C
FIG. 6A  FIG. 6B  FIG. 6C

SYSTEMS AND METHODS FOR GAUSSIAN FILTER STANDARD DEVIATION VARIATION

TECHNICAL FIELD

Embodiments described herein generally relate to systems and methods for Gaussian filter standard deviation variation and, more specifically, to balancing switching loss and electromagnetic interference through the use of a dynamic Gaussian filter standard deviation.

BACKGROUND

In many environments, such as vehicles, there is a plurality of physical, electric, and/or electronic components, such as a switching converter, that may cause electromagnetic interference (EMI) that could interfere with other components in the environment. In many of these current solutions, an EMI shield may be installed to prevent or block EMI generated by the switching converter from affecting other components. While an EMI shield may have some success in preventing EMI from affecting certain components, these solutions are far from ideal, as oftentimes the shields may not fully insulate the EMI or may otherwise be undesirable.

SUMMARY

Systems and methods for Gaussian filter standard deviation variation. One embodiment of a method includes receiving a load current and a drain voltage associated with a switching converter that includes a Silicon Carbide (SiC) Mosfet transistor, determining a derivative of the drain voltage with respect to time, and calculating a switching loss associated with the switching converter. Some embodiments include predicting electromagnetic interference (EMI), selecting a Gaussian standard deviation from the switching loss, and determining a Gaussian switching voltage reference. Still some embodiments include adjusting a component of the SiC Mosfet transistor, based on the Gaussian standard deviation, and the Gaussian switching voltage reference to provide a desired switching loss.

In another embodiment, a system includes a switching converter that includes a Silicon Carbide (SiC) Mosfet transistor that produces a load current and a drain voltage and an amplifier that is coupled to the switching converter, where the amplifier receives feedback gains of the load current and the drain voltage, and the amplifier determines a derivative of the drain voltage with respect to time. Some embodiments include a computing device that is coupled to the amplifier and the switching converter, the computing device comprising logic that when executed by a processor, causes the system to receive the load current, the drain voltage, and the derivative of the drain voltage with respect to time, calculate a switching loss and predict an electromagnetic interference (EMI) associated with the switching converter, and select a Gaussian standard deviation from the switching loss and the derivative of the drain voltage with respect to time. In some embodiments, the logic causes the system to determine a Gaussian switching voltage reference and send an adjustment to be made in the SiC Mosfet transistor for implementation.

In yet another embodiment, a system includes a switching converter, where the switching converter comprises a Silicon Carbide (SiC) Mosfet transistor that produces a load current and a drain voltage and a vehicle computing device. The vehicle computing device may b e coupled to the switching converter, and may include logic that when executed by a processor, causes the system to receive the load current, the drain voltage, and a derivative of the drain voltage with respect to time and calculate a switching loss and predict an electromagnetic interference (EMI) associated with the switching converter. In some embodiments the logic causes the system to select a Gaussian standard deviation from the switching loss and the derivative of the drain voltage with respect to time, determine a Gaussian switching voltage reference, and send an adjustment to be made in the SiC Mosfet transistor for implementation.

These and additional features provided by the embodiments of the present disclosure will be more fully understood in view of the following detailed description, in conjunction with the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIGS. 5A-5C depict graphical representations of a turn-on drain voltage and drain current switching waveform with a plurality of different transient periods, according to embodiments disclosed herein;

FIGS. 6A-6C depicts another set of graphical representation of a turn-on drain voltage and drain current switching waveform with an adjusted transient period, according to embodiments disclosed herein;

DETAILED DESCRIPTION

Embodiments disclosed herein include systems and methods for Gaussian filter standard deviation variation and specifically for Silicon Carbide (SiC) Mosfet control. Accordingly, some embodiments may be configured to use Gaussian standard deviation to tune the width of the Gaussian switching waveform. Some embodiments focus on reducing EMI noise generation instead of (or in addition to) trying to block the conducting and emitting paths (filters and shields). Depending on the load condition, embodiments described herein further improve the trade-off between loss and EMI by varying Gaussian filter standard deviation to produce different length of switching transients. With different switching transients, EMI emission level can be controlled as well as the loss. Therefore, a desired trade-off between loss and EMI can be obtained.

Additionally, embodiments described herein are configured to utilize different Gaussian filter standard deviations to balance the trade-off between loss and EMI. Embodiments may be configured to vary standard deviation, so that loss can be controlled. At higher load condition, the loss can be reduced by decreasing switching a transient period at the expense of higher EMI noise. On the other hand, during low load condition, switching the transient period can be increased to reduce EMI noise generation. By selecting different Gaussian standard deviations, the trade-off between loss and EMI can be controlled while EMI noise is minimized since Gaussian switching waveform is used.

Thus, embodiments described herein may be configured to extend the Gaussian switching waveform, so that the trade-off between loss and EMI can be controlled. Optimization depending on the load condition and EMI requirement can be implemented to obtain the desired trade-off; and notwithstanding the trade-off, EMI is reduced. Accordingly, depending on the location of and the switching converter, EMI can be reduced and controlled in an environment. By implementing embodiments described herein, the problems of EMI sensitive devices (radio system, Bluetooth, etc.) can be reduced and relieved by trade-off of switching device EMI and loss.

Figure 1:
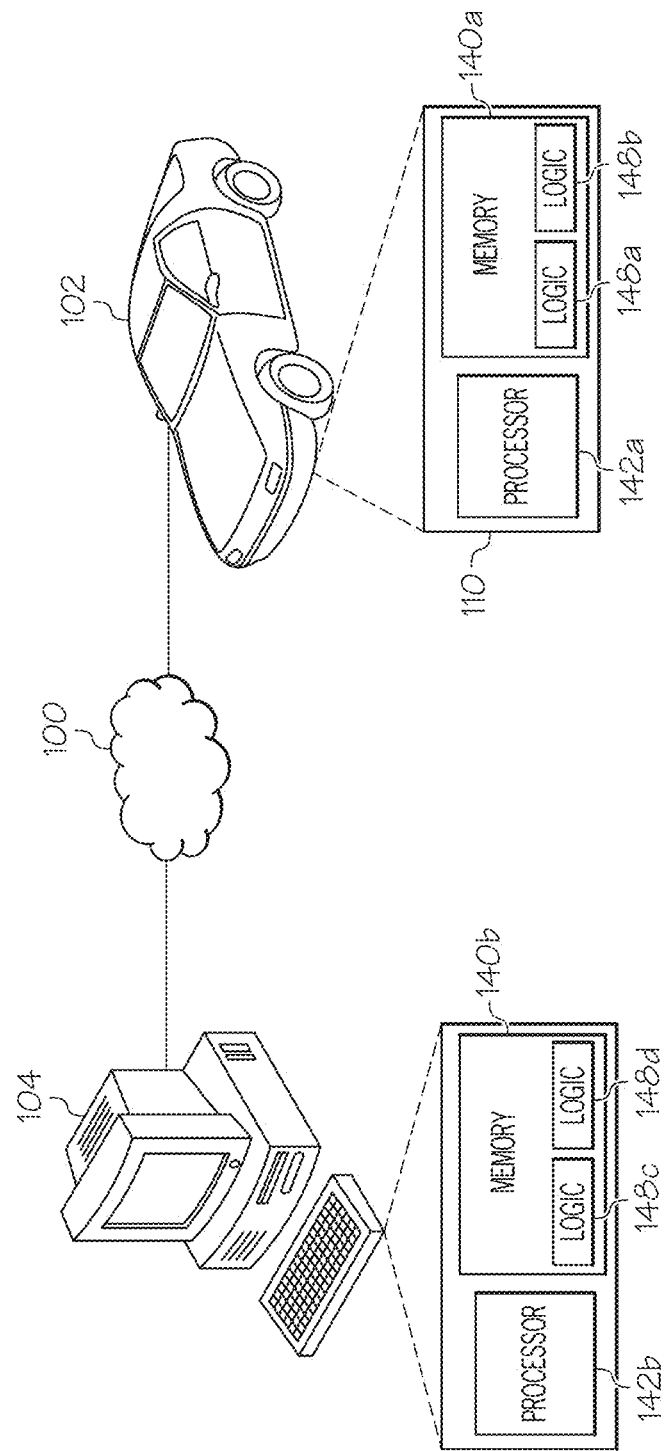
FIG. 1 schematically depicts a network environment for Gaussian filter standard deviation variation, according to embodiments disclosed herein.

The systems and methods for Gaussian filter standard deviation variation incorporating the same will be described in more detail, below. Specifically referring to the drawings, FIG. 1 schematically depicts a network environment for Gaussian filter standard deviation variation, according to embodiments disclosed herein. As illustrated, the embodiment of FIG. 1 depicts a vehicle 102 coupled to a user computing device 104 via a network 100. The vehicle 102 may include a vehicle computing device 110 that operates as an integrated vehicle system and facilitates operation of one or more components of the vehicle 102. The components may include one or more portions of an engine, a radio, an in-dash display, and/or other electrical-based devices. Additionally, the vehicle 102 may include the vehicle computing device 110, which may include a memory component 140a and a processor 142b. The memory component 140a may store logic, such as data receiving logic 148a and calculation logic 148b. As illustrated in more detail in FIG. 2, the vehicle 102 may also include a switching converter 230 (FIG. 2) for converting voltage to utilize one or more of the electrical devices.

Depending on the embodiment, the user computing device 104 may be coupled to the vehicle computing device 110 during production such that the data receiving logic 148a and/or the calculation logic 148b may facilitate a determination of the EMI emitted by the switching converter 230 and/or other components and adjust the Gaussian standard deviation, as described herein. While in some embodiments, the vehicle computing device 110 may be configured to make this determination, some embodiments may be configured for the user computing device 104 to provide this functionality. Accordingly, the user computing device 104 may include determining logic 148c and analysis logic 148d. Depending on the particular embodiment, this logic 148c, 148d may reside in the vehicle computing device 110 and/or elsewhere to provide the desired functionality. Accordingly, the memory component 140a and/or the memory component 140b (collectively and individually referred to as "the memory component 140") may include logic for providing loss calculation and EMI prediction from derivative speed, as illustrated in the switching converter 230.

It should be understood that, while not explicitly depicted in FIG. 1, the user computing device 104 and/or the vehicle computing device 110 may include other components for implementing the functionality described herein. As an example, either of these computing devices 104, 110 may include input/output hardware, network interface hardware, a data storage component for storing data, etc.

Additionally, the memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD) (whether local or cloud-based), and/or other types of non-transitory computer-readable mediums. The memory component 140 may store operating logic and the other logic components described herein. Each of these logic components may include a plurality of different pieces of logic, each of which may be embodied as a computer program, firmware, and/or hardware, as an example. A local interface may also be included and may be implemented as a bus or other communication interface to facilitate communication among the components of the computing device 104, 110.

The processor 142 may include any processing component operable to receive and execute instructions (such as from a data storage component and/or the memory component 140). As will be understood, the input/output hardware may include and/or be configured to interface with the components of FIG. 2. The network interface hardware may include and/or be configured for communicating with any wired or wireless networking hardware, including an antenna, a modem, a LAN port, wireless fidelity (Wi-Fi) card, WiMax card, mobile communications hardware, and/or other hardware for communicating with other networks and/or devices. From this connection, communication may be facilitated between or among computing devices 104, 110 and/or others.

The operating logic may include an operating system and/or other software for managing components of the computing device 104, 110. As discussed above, the data receiving logic 148a and the calculation logic 148b may be configured to cause the processor 142a to receive information from the switching converter 230 and/or amplifier 244, as well as perform the other functionality described herein. The determining logic 148c and the analysis logic 148d may be configured to cause the processor 142b to perform similar functionality via a remote connection to the vehicle 102.

Additionally, while the example of FIG. 1 is illustrated with the logic 148a, 148b, 148c, and 148d as separate logical components, this is also an example. In some embodiments, a single piece of logic may provide the described functionality. It should also be understood that while the logic 148a, 148b, 148c, and 148d are described herein as the logical components for performing the described functionality, this is also an example. Other components may also be included, depending on the embodiment.

Figure 2:
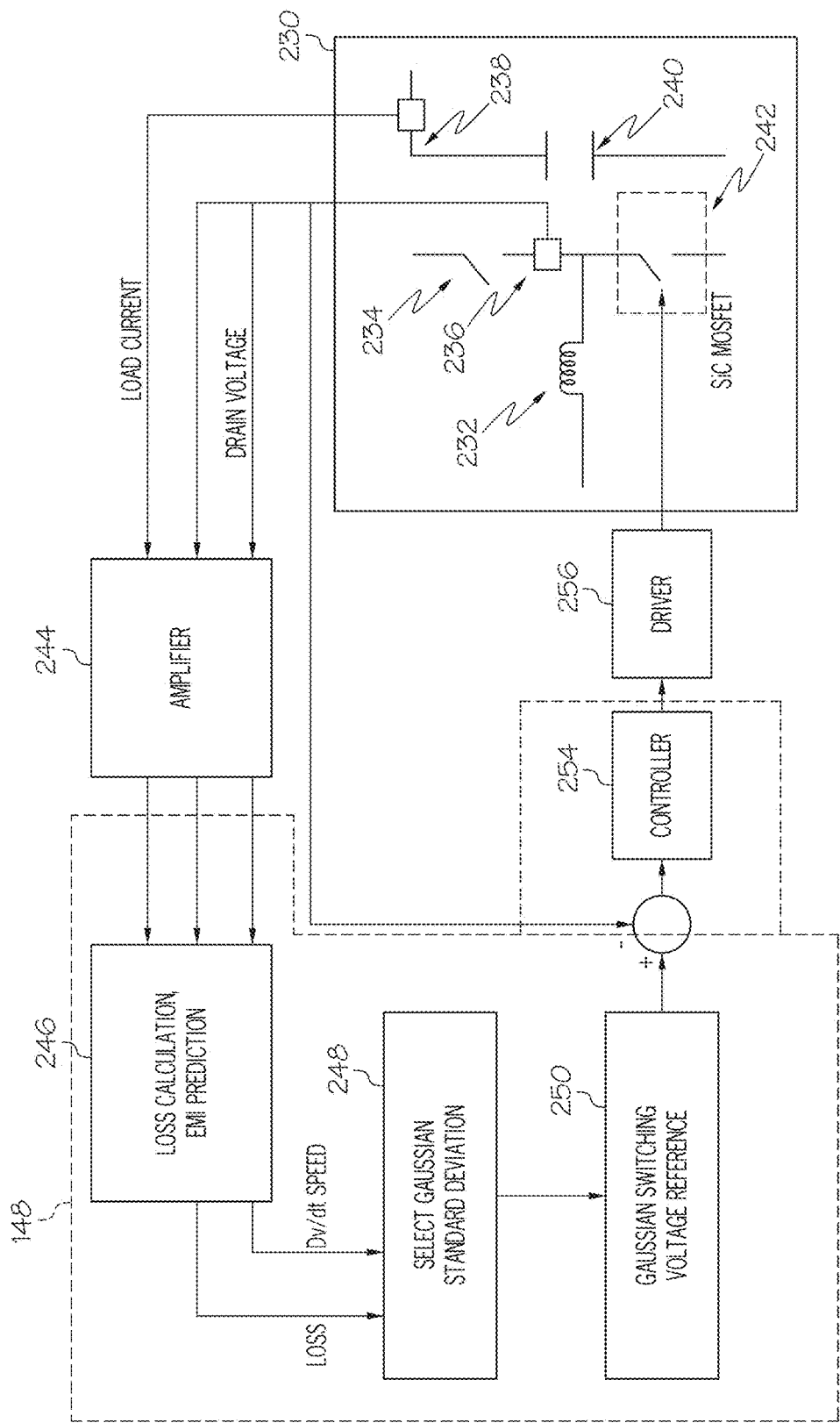
FIG. 2 schematically depicts a hybrid circuit-flow diagram for implementing Gaussian filter standard deviation variation, according to embodiments disclosed herein.

FIG. 2 schematically depicts a hybrid circuit-flow diagram for implementing Gaussian filter standard deviation variation, according to embodiments disclosed herein. As illustrated, the vehicle 102 may include at least one switching converter 230, which may be implemented a voltage converter or other similar device. The switching converter 230 may include an inductor 232, a switch 234, a voltage sensor 236, a current sensor 238, a capacitor 240, and a silicon carbide (SiC) Mosfet transistor 242. The voltage sensor 236 may determine a drain voltage of the SiC Mosfet transistor 242, which is sent to an amplifier 244 as a feedback signal. The amplifier 244 may also receive a load current from the current sensor 238, also as a feedback signal. With this information, the amplifier 244 may determine a slope (derivative) of the drain voltage over time ($dV_d/dt$), and provide feedback gains which are sent with the load current and the drain voltage to the vehicle computing device 110 and/or the user computing device 104.

Depending on the particular embodiment, the calculation logic 148b and/or the analysis logic 148d may be utilized by a processor 142a, 142b of the respective computing device 104, 110 to calculate switching loss of the switching converter 230. In block 246, the logic 148 may additionally cause the respective computing device 104, 110 to utilize the slope of the drain voltage to predict EMI in the switching converter 230. In some embodiments, the EMI may be predicted as being approximately proportional or related to the slope of the drain voltage. In these examples, if $dV_d/dt$ is 2 when the EMI is about 4, then if $dV_d/dt$ is 4, the EMI may be predicted as being about 8. In block 248, the predicted EMI and the switching loss may then be utilized to select a Gaussian standard deviation for use in the switching converter 230. This selection may be made via a lookup table and/or may be calculated based on a predetermined algorithm. Regardless, a Gaussian switching reference may be determined from the selected Gaussian standard deviation in block 248, which may be represented by a waveform. Specifically, the Gaussian switching voltage reference may be determined via Gaussian waveform, with the selected Gaussian standard deviation applied. The Gaussian switching voltage reference may be compared with a feedback Gaussian function in the form of an actual waveform in the switching converter 230. This comparison may indicate the adjustment to the switching converter 230 to achieve the desired result. The adjustment may then be sent to the driver 256 via a controller 254 for implementing the desired change. As discussed above, some embodiments may be configured such that the switching loss and the EMI may be inversely related, such that an increase in switching speed (and thus increasing EMI) may reduce switching loss, while a decrease in switching speed may increase switching loss. Regardless, the driver 256 may facilitate implementing the adjustment to the SiC Mosfet transistor 242 and/or the switching converter 230.

Figure 3:
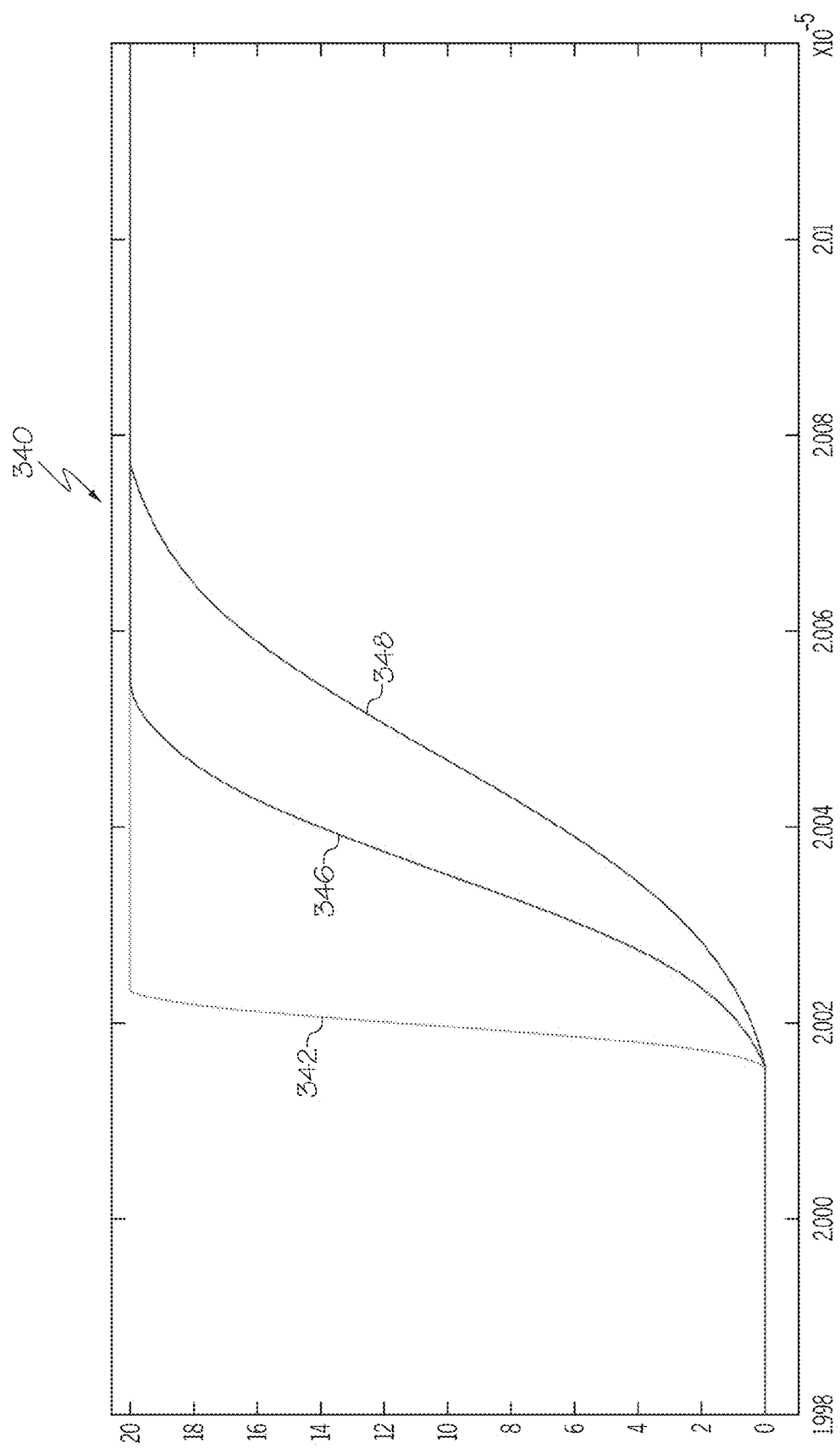
FIG. 3 depicts a graphical representation of Gaussian switching waveform in the time domain, according to embodiments disclosed herein.

FIG. 3 depicts a graphical representation 340 of generic Gaussian switching waveforms in the time domain, according to embodiments disclosed herein. As illustrated, FIG. 3 depicts a Gaussian switching waveform reference calculated from the convolution of a square waveform and a Gaussian function. The convoluted switching transient periods are illustrated as 10 nanoseconds (light blue, plot 342), 50 nanoseconds (red, plot 346), and 80 nanoseconds (dark blue, plot 348) for corresponding load conditions 20 Amperes, 10 Amperes, and 5 Amperes and corresponding frequency spectrums, where the magnitude of the spectrum is normalized at about 1 microvolt.

Specifically, by convoluting the Gaussian function with a square wave, the convoluted switching transients can be used to control the switching converter 230 to generate lower EMI noise. Accordingly, by varying the standard deviation of the Gaussian function, loss can be controlled as well. At a higher load condition, the switching loss can be reduced by decreasing the switching transient period at the expense of higher EMI noise. On the other hand, during low load conditions, the switching transient period can be increased to reduce EMI noise generation. By selecting different Gaussian standard deviations, the tradeoff between the switching loss and EMI can be controlled while EMI noise may be minimized since a Gaussian switching waveform is used.

Figure 4:
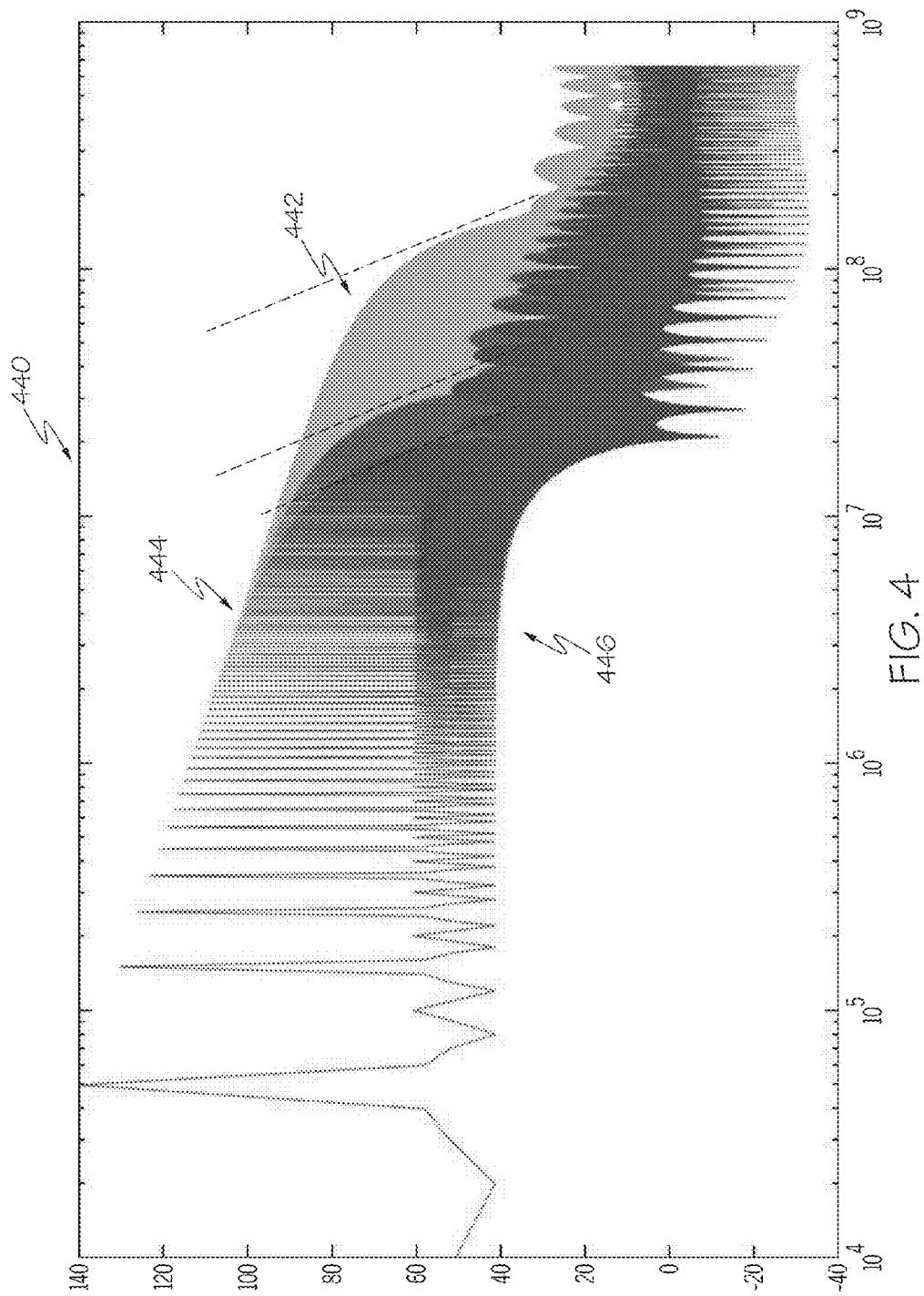
FIG. 4 depicts a graphical representation of a frequency spectrum of a drain voltage on a logarithmic scale in the frequency domain, according to embodiments disclosed herein.

FIG. 4 depicts a graphical representation 440 of a frequency spectrum of a drain voltage on a logarithmic scale in the frequency domain, according to embodiments disclosed herein. As illustrated, the Gaussian switching waveforms of FIG. 3 may be provided in the frequency domain to represent the transitions. The plot 442 (light blue) includes a Gaussian standard deviation of 2.5 nanoseconds with s switching period of 10 nanoseconds. The plot 444 (red) includes a standard deviation of 12.5 nanoseconds and a transient period of 50 nanoseconds. The plot 446 (dark blue) includes a standard deviation of 20 nanoseconds and a transient period of 80 nanoseconds.

As illustrated with the generic Gaussian function and the frequency spectrum of FIGS. 3 and 4, by altering the standard deviation of the Gaussian function, the EMI may be adjusted as well. Specifically, the plot 442 has a faster transient period (10 nanoseconds) and thus has a higher EMI than the plot 446, which has a slower transient period (80 nanoseconds). Accordingly, FIGS. 3 and 4 indicate a relationship between standard deviation of the Gaussian function and the EMI.

FIGS. 5A-5C depict graphical representations of a turn-on drain voltage (red) and drain current (blue) switching waveform with a plurality of (variable) different transient periods, according to embodiments disclosed herein. Specifically, FIGS. 5A-5C depict the turn-on switching waveforms of a SiC Mosfet drain voltage and drain current for three different transient periods controlled by three different Gaussian switching waveform commands and the corresponding total losses on the switch (conduction loss, plus switching loss) from the circuit of FIG. 2. Accordingly, FIG. 5A depicts a plot 540a with 10 nanosecond transient period, a 20 Ampere load and a 37.04 Watt loss. In FIG. 5B, a plot 540b is depicted with a transient period of 50 nanoseconds and a 10 Ampere load, resulting in a 22.48 Watt loss. In FIG. 5C, a plot 540c is depicted the transient period is 80 nanoseconds and the load is 5 Amperes, resulting in a 14.75 Watt loss. As can be seen from the examples of FIGS. 5A-5C, as the transient period increases and the load decreases, the loss may also decrease.

FIGS. 6A-6C depicts another set of graphical representations of a turn-on drain voltage (red) and drain current (blue) switching waveform with an adjusted (fixed) transient period, according to embodiments disclosed herein. Similar to FIGS. 5A-5C, FIGS. 6A-6C depict a plurality of graphical representations of loss versus EMI with a fixed Gaussian standard deviation filter deviation of 12.5 nanoseconds from the circuit of FIG. 2. In FIG. 6A, the graphical representation includes a plot 640a, which includes a 50 nanosecond transient period and a 20 Ampere load, resulting in a 38.06 Watt loss. In FIG. 6B, the graphical representation includes a plot 640b, with a 50 nanosecond transient period and a 10 Ampere, resulting in a 22.48 Watt loss. In FIG. 6C, the graphical representation includes a 50 nanosecond transient period with a 5 Ampere load, resulting in a 12.4 Watt loss.

As illustrated in the Table below, the representations of FIGS. 5A-5C and 6A-6C are depicted. As illustrated, FIGS. 5A and 6A represent that with the same load (20 Amperes), the average loss is less with a higher transient period. FIGS. 5B and 6B illustrate that the same switching loss. FIGS. 5C and 6C illustrate that with a longer transient period, the switching loss is higher. Accordingly, the Table depicts the same information, illustrating the relationship between the standard deviation and the transient period.

TABLE

| With variable Gaussian filter standard deviation | | | |
|---|---|---|---|
| | Standard Deviation = 2.5 ns, 10 ns transient | Standard Deviation = 12.5 ns, 50 ns transient | Standard Deviation = 20 ns, 80 ns transient |
| Load current (A) | 20 | 10 | 5 |
| Average loss on 1 switch (W) | 37.04 | 22.48 | 14.75 |

| Without variable Gaussian filter standard deviation | | | |
|---|---|---|---|
| | σ = 12.5 ns, 50 ns transient | σ = 12.5 ns, 50 ns transient | σ = 12.5 ns, 50 ns transient |
| Load current (A) | 20 | 10 | 5 |
| Average loss on 1 switch (W) | 38.06 | 22.48 | 12.4 |

Figure 7:
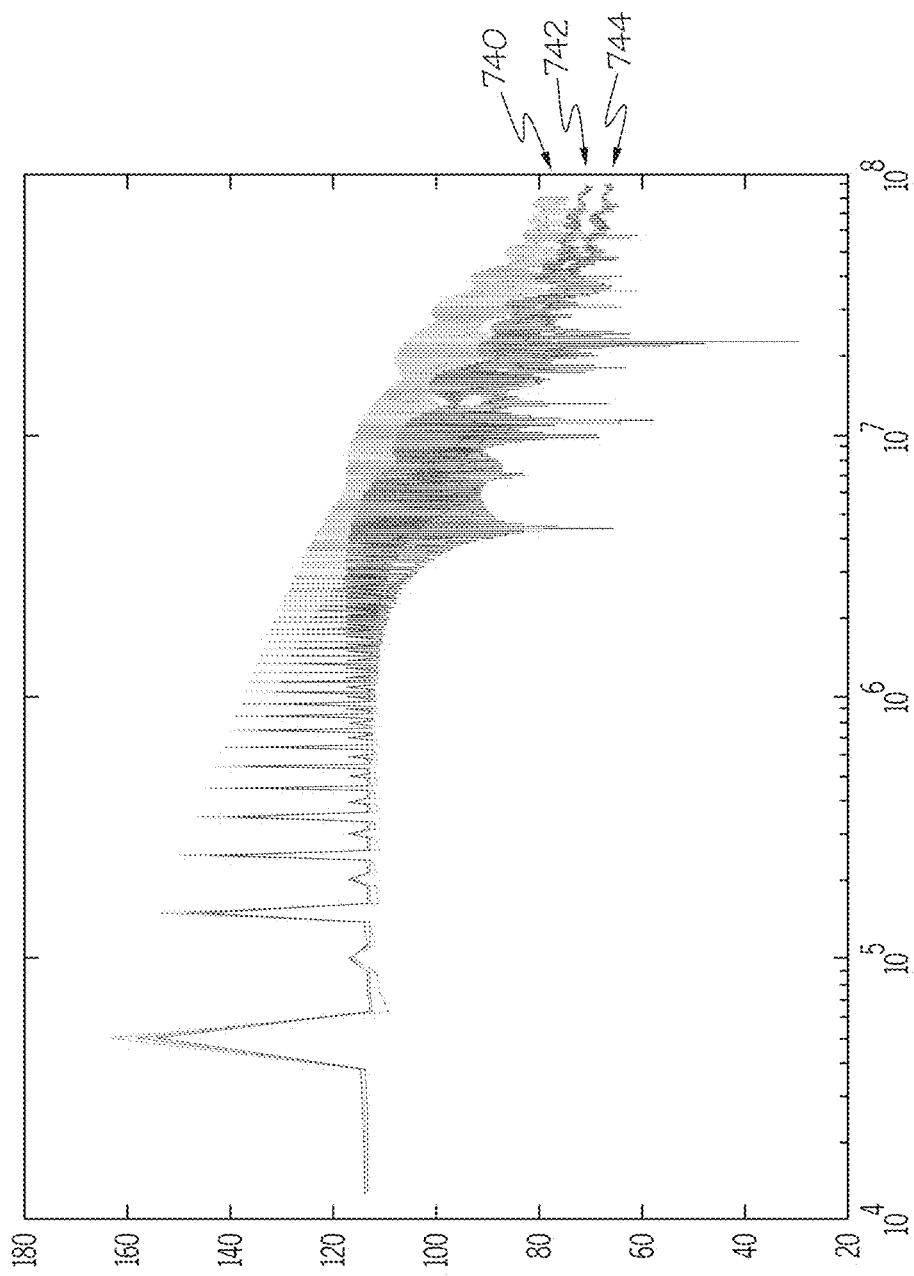
FIG. 7 depicts a graphical representation of a drain voltage spectrum, according to embodiments disclosed herein.

FIG. 7 depicts a graphical representation of a drain voltage spectrum, according to embodiments disclosed herein. Specifically, the information from FIGS. 5A-5C was modified via a fast Fourier transform (FFT). Accordingly, the plots 740 (light blue), 742 (red), and 774 (dark blue) represent the EMI generated at the various standard deviations. Specifically, the plot 740 was created utilizing a 2.5 nanosecond standard deviation for a 20 Ampere load. The plot 742 was created with a 12.5 nanosecond standard deviation for a 10 Ampere load. The plot 744 was created with a 20 nanosecond standard deviation for a 5 Ampere load. Accordingly, it can be seen that by adjusting the standard deviation of the Gaussian function of the switching converter 230 (FIG. 2), the EMI may be similarly changed. As an example, at a frequency $10^7$, the plot 744 has a lower magnitude than the plot 740. Thus, by increasing the standard deviation of the Gaussian function, the EMI will reduce.

Figure 8:
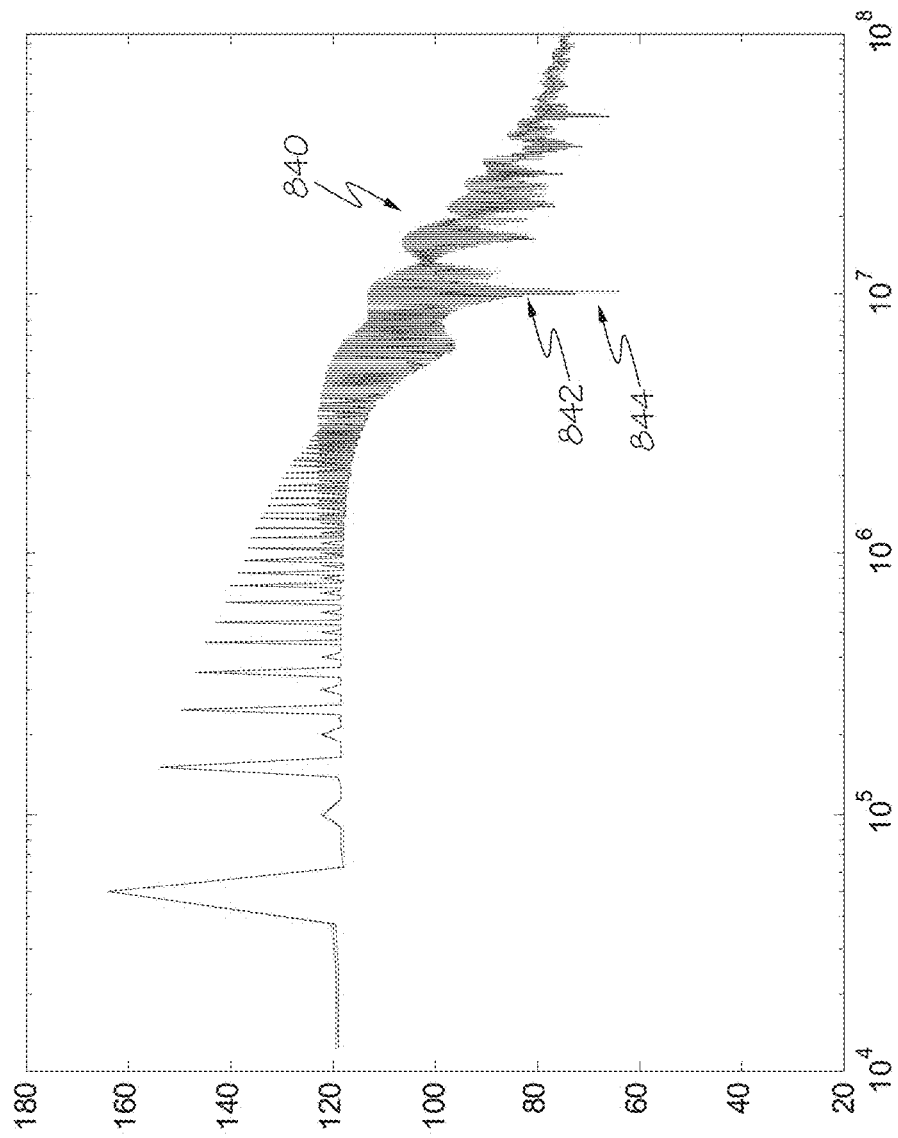
FIG. 8 depicts a graphical representation of a drain voltage illustrating Gaussian filter waveform shaping, according to embodiments disclosed herein.

FIG. 8 depicts a graphical representation of a drain voltage illustrating Gaussian filter waveform shaping, according to embodiments disclosed herein. Specifically, it is observed that EMI can be reduced by slightly increasing loss (and vice versa) for any desired trade-off. FIG. 8 represents similar information as depicted in FIG. 7, except that a FFT was applied to the data illustrated in FIGS. 6A-6C. As discussed above, these plots maintain a constant standard deviation of the Gaussian function, illustrating non-optimized switching loss with respect to EMI. Specifically, the EMI is essentially the same for each of the plots 840 (light blue), 842 (red), and 844 (dark blue). Accordingly, the plot 840 depicts a standard deviation of 12.5 nanoseconds for a 20 Ampere load. The plot 842 depicts a 12.5 nanosecond standard deviation for a 10 Ampere load. The plot 844 includes a 12.5 nanosecond for a 5 Ampere load.

Comparing these results to the embodiments of this disclosure depicted in FIGS. 5A-5C and FIG. 7, in the case of a 20 Ampere load, the EMI may be reduced with a 0.99 Watt total loss increase (38.06 Watt to 37.07 Watt). On the other hand, for a 5 Ampere load embodiment, the EMI is increased, with loss decreasing 2.35 Watts (from 14.75 Watts–12.4 Watts). Meanwhile, the EMI may be minimized for a predetermined switching period as the Gaussian switching command may be used for any of several different situations.

Figure 9:
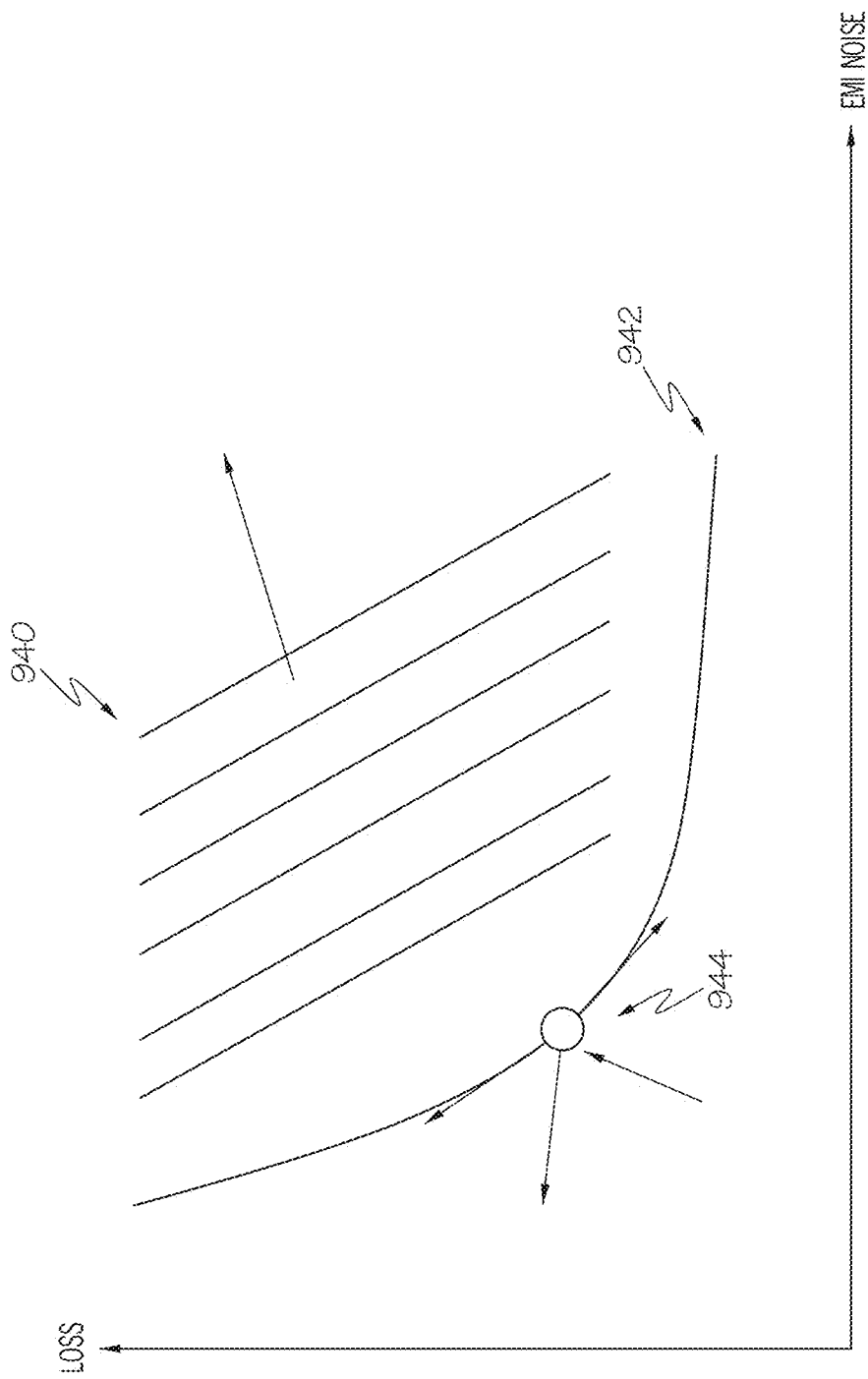
FIG. 9 depicts a graphical representation of switching loss versus EMI noise, utilizing Gaussian standard deviation shaping, according to embodiments disclosed herein.

FIG. 9 depicts a graphical representation 940 of switching loss versus EMI noise, utilizing Gaussian standard deviation shaping, according to embodiments disclosed herein. As illustrated, graphical representation 940 illustrates a plurality of diagonal lines, which represent the non-optimized results associated with current solutions. Also illustrated is the curve 942, which represents the shape of the desired switching loss and the desired EMI noise trade-off when varying the standard deviation of the Gaussian function, as described above. The marker 944 may represent a desired point, based on a particular system. Specifically, if a particular system can tolerate a higher loss, but desires a lower EMI, the desired results may follow the curve 942.

As an example, as load current increases, a higher loss may be created. Accordingly, embodiments herein may be configured to utilize a variable standard deviation to tradeoff EMI with loss (moving down the curve 942). Similarly, if a circuit has a lower load (lower loss from the switching converter), the standard may again be altered to increase the loss and reduce EMI.

Figure 10:
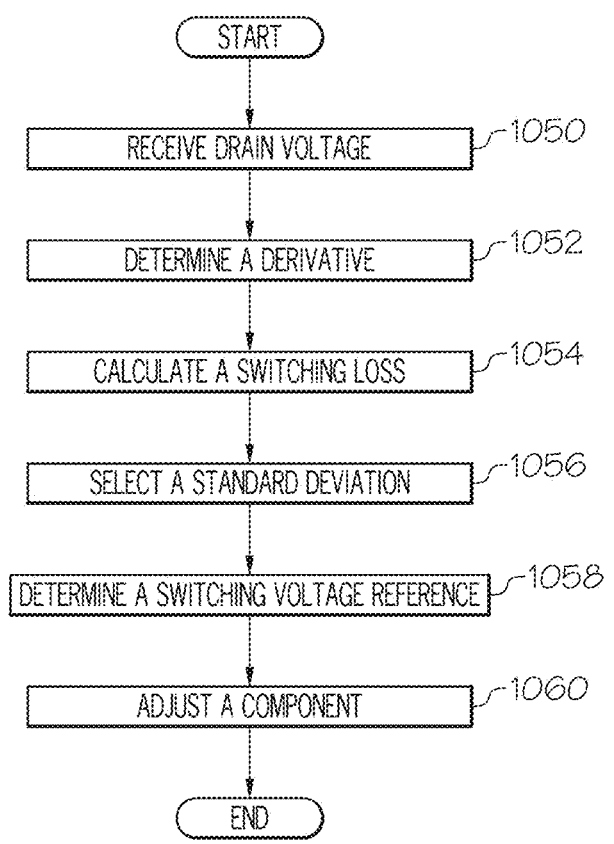
FIG. 10 depicts a flowchart for Gaussian filter standard deviation variation, according to embodiments disclosed herein.

FIG. 10 depicts a flowchart for Gaussian filter standard deviation variation, according to embodiments disclosed herein. As illustrated in block 1050, drain voltage may be received. Additionally, depending on the particular embodiment, other signals may be received, such as load current, etc. In block 1052, a derivative of the drain voltage. In block 1054, a switching loss may be calculated. In block 1056, a standard deviation may be selected, such as via a lookup table. In block 1058, a switching voltage reference may be determined. In block 1060, a component of the switching converter may be adjusted.

As illustrated above, various embodiments for Gaussian filter standard deviation variation are disclosed. Accordingly, embodiments described herein may be configured to minimize EMI and/or switching loss, based on the system tolerances.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for Gaussian filter standard deviation variation. It should also be understood that these embodiments are merely exemplary and are not intended to limit the scope of this disclosure.

What is claimed is:

1. A method for Gaussian filter standard deviation variation comprising:
   receiving, by a computing device, a load current and a drain voltage associated with a switching converter that includes a Silicon Carbide (SiC) Mosfet transistor;

determining, by the computing device, a derivative of the drain voltage with respect to time;

calculating, by the computing device, a switching loss associated with the switching converter;

predicting, by the computing device, electromagnetic interference (EMI), wherein the EMI is approximately proportional to the derivative of the drain voltage with respect to time;

selecting, by the computing device, a Gaussian standard deviation from the switching loss and the derivative of the drain voltage with respect to time;

determining, by the computing device, a Gaussian switching voltage reference; and adjusting, by the computing device, a component of the SiC Mosfet transistor, based on the Gaussian standard deviation, and the Gaussian switching voltage reference to provide a desired switching loss.

2. The method of claim 1, further comprising:
receiving a feedback signal from the switching converter, wherein the feedback signal includes the drain voltage; and comparing the feedback signal to the Gaussian switching voltage reference to determine an adjustment to provide the desired switching loss.

3. The method of claim 1, wherein the desired switching loss is determined based on a desired EMI, wherein the desired switching loss and the desired EMI are mathematically related.

4. The method of claim 1, wherein selecting the Gaussian standard deviation includes accessing a lookup table.

5. The method of claim 1, wherein the desired switching loss and a desired EMI are inversely related, such that an increase in the desired EMI reduces the desired switching loss.

6. The method of claim 1, wherein adjusting the component of the SiC Mosfet transistor includes adjusting a switching period of the SiC Mosfet transistor.

7. The method of claim 1, further comprising converting wherein the Gaussian standard deviation is also selected based on the load current.

8. A system for Gaussian filter standard deviation variation comprising:
a switching converter, wherein the switching converter comprises a Silicon Carbide (SiC) Mosfet transistor that produces a load current and a drain voltage;
an amplifier that is coupled to the switching converter, wherein the amplifier receives feedback gains of the load current and the drain voltage, wherein the amplifier determines a derivative of the drain voltage with respect to time; and
a computing device that is coupled to the amplifier and the switching converter, the computing device comprising logic that when executed by a processor, causes the system to perform at least the following:
receive the load current, the drain voltage, and the derivative of the drain voltage with respect to time;
calculate a switching loss and predict an electromagnetic interference (EMI) associated with the switching converter;
select a Gaussian standard deviation from the switching loss and the derivative of the drain voltage with respect to time;
determine a Gaussian switching voltage reference; and
send an adjustment to be made in the SiC Mosfet transistor for implementation.

9. The system of claim 8, wherein the switching converter further comprises an inductor, a capacitor, a voltage sensor, and a current sensor.

10. The system of claim 8, further comprising a driver that is coupled to the computing device and the switching converter, wherein the driver receives the adjustment to be made in the SiC Mosfet transistor and sends a command for making the adjustment.

11. The system of claim 8, wherein the switching converter and the computing device are part of an integrated vehicle system.

12. The system of claim 8, wherein the switching converter is part of an integrated vehicle system and wherein the computing device is remote from the integrated vehicle system but communicatively coupled to the integrated vehicle system.

13. The system of claim 8, wherein the logic further causes the system to compare the Gaussian switching voltage reference to a feedback Gaussian function to determine the adjustment.

14. The system of claim 8, wherein adjusting the SiC Mosfet transistor includes adjusting a switching period of the SiC Mosfet transistor.

15. A system for Gaussian filter standard deviation variation comprising:
a switching converter, wherein the switching converter comprises a Silicon Carbide (SiC) Mosfet transistor that produces a load current and a drain voltage; and
a vehicle computing device that is coupled to the switching converter, the vehicle computing device comprising logic that when executed by a processor, causes the system to perform at least the following:
receive the load current, the drain voltage, and a derivative of the drain voltage with respect to time;
calculate a switching loss and predict an electromagnetic interference (EMI) associated with the switching converter;
select a Gaussian standard deviation from the switching loss and the derivative of the drain voltage with respect to time;
determine a Gaussian switching voltage reference; and
send an adjustment to be made in the SiC Mosfet transistor for implementation.

16. The system of claim 15, further comprising an amplifier, wherein the amplifier receives the load current and the drain voltage from the switching converter, wherein the amplifier determines the derivative of the drain voltage with respect to time, and wherein the amplifier provides the load current, the drain voltage, and the derivative of the drain voltage with respect to time to the vehicle computing device.

17. The system of claim 15, wherein the logic further causes the system to access a lookup table to select the Gaussian standard deviation.

18. The system of claim 15, further comprising a driver that is coupled to the vehicle computing device and the switching converter, wherein the driver makes the adjustment to the switching converter.

19. The system of claim 15, wherein the switching converter further comprises an inductor, a capacitor, a voltage sensor, and a current sensor.

20. The system of claim 15, wherein the logic further causes the system to compare the Gaussian switching voltage reference to a feedback Gaussian function to determine the adjustment.

* * * * *